(12) United States Patent
Van De Heyning

(10) Patent No.: US 10,632,407 B2
(45) Date of Patent: Apr. 28, 2020

(54) METHOD AND DEVICE FOR ARRANGING A GAS FILTER ON A COMPONENT OF A RECIPIENT

(71) Applicant: SAC 02 NV, Nevele (BE)

(72) Inventor: Roel Luc Van De Heyning, Ghent (BE)

(73) Assignee: SAC 02 NV, Nevele (BE)

( * ) Notice: Subject to any disclaimer, the term of this patent is extended or adjusted under 35 U.S.C. 154(b) by 238 days.

(21) Appl. No.: 15/751,550

(22) PCT Filed: Aug. 22, 2016

(86) PCT No.: PCT/BE2016/000041
§ 371 (c)(1),
(2) Date: Feb. 9, 2018

(87) PCT Pub. No.: WO2017/031557
PCT Pub. Date: Mar. 2, 2017

(65) Prior Publication Data
US 2018/0229168 A1 Aug. 16, 2018

(30) Foreign Application Priority Data
Aug. 24, 2015 (BE) .................................. 2015/5523

(51) Int. Cl.
*B01D 46/10* (2006.01)
*B29C 65/08* (2006.01)
(Continued)

(52) U.S. Cl.
CPC ......... *B01D 46/0001* (2013.01); *B01D 46/14* (2013.01); *B29C 65/7882* (2013.01);
(Continued)

(58) Field of Classification Search
CPC ...... B01D 46/001; B01D 46/10; B01D 46/14; B01D 2265/04; B29L 2031/14;
(Continued)

(56) References Cited

U.S. PATENT DOCUMENTS 3,710,948 A * 1/1973 Sexton .................. B01D 46/02
210/484
4,120,715 A 10/1978 Ockwell et al.
(Continued)

FOREIGN PATENT DOCUMENTS

WO WO94/22557 A1 10/1994

OTHER PUBLICATIONS

International Preliminary Report on Patentability dated Oct. 13, 2017; for PCT/BE2016/000041; 7 Pages.
(Continued)

*Primary Examiner* — Frank M Lawrence, Jr.
(74) *Attorney, Agent, or Firm* — Shay Glenn LLP

(57) ABSTRACT

Method for arranging on a component of a recipient (100) a gas filter comprising a filter layer of filter material (120) and a cover layer of covering material (130), wherein the filter layer (120) is located between the component of the recipient (100) and the cover layer (130), the method further comprising: welding the filter layer (120) and the cover layer (130) to the component of the recipient (100) by arranging welds (140) such that between two welds (140), welds tunnels (150) filled with filter material (120) are formed, which are intended to enable gas exchange between the interior of the recipient (100) and an area externally of the recipient (100).

20 Claims, 3 Drawing Sheets

(51) Int. Cl.
  *B01D 46/00* (2006.01)
  *B29C 65/78* (2006.01)
  *B29C 65/00* (2006.01)
  *B01D 46/14* (2006.01)
  *B29L 31/14* (2006.01)

(52) U.S. Cl.
  CPC .......... *B29C 66/4722* (2013.01); *B01D 46/10* (2013.01); *B01D 2265/04* (2013.01); *B29C 65/08* (2013.01); *B29C 66/02241* (2013.01); *B29C 66/1122* (2013.01); *B29C 66/5326* (2013.01); *B29C 66/729* (2013.01); *B29C 66/7294* (2013.01); *B29C 2793/0018* (2013.01); *B29C 2793/0081* (2013.01); *B29L 2031/14* (2013.01)

(58) Field of Classification Search
  CPC ................ B29C 65/08; B29C 65/7882; B29C 66/02241; B29C 66/1122; B29C 66/4722; B29C 66/5326; B29C 66/729; B29C 66/7294; B29C 2793/0018; B29C 2793/0081

USPC ......................................... 55/490, 511, 385.4
  See application file for complete search history.

(56) References Cited

U.S. PATENT DOCUMENTS

| | | | |
|---|---|---|---|
| 4,318,406 A | 3/1982 | McLeod | |
| 4,579,658 A * | 4/1986 | Moller | B01D 46/10 210/483 |
| 5,019,254 A * | 5/1991 | Abrevaya | A01K 63/045 210/167.22 |
| 5,630,940 A * | 5/1997 | Van Rossen | B01D 46/0036 210/484 |
| 5,997,614 A | 12/1999 | Tuma et al. | |
| 7,059,481 B2 * | 6/2006 | Kochert | B01D 29/111 210/437 |

OTHER PUBLICATIONS

International Search Report and Written Opinion dated Jul. 12, 2016; for PCT/BE2016/000041; 11 pages.

* cited by examiner

METHOD AND DEVICE FOR ARRANGING A GAS FILTER ON A COMPONENT OF A RECIPIENT

FIELD OF THE INVENTION

The present invention relates to a method and a device for arranging a gas filter on a component of a recipient. The invention relates more particularly to a method and a device for arranging on a component of a recipient a gas filter comprising a filter layer of filter material and a cover layer of covering material.

BACKGROUND OF THE INVENTION

According to the prior art the process of arranging similar gas filters on recipients consists of two separate phases. In a first phase the gas filters per se are produced and in a second phase the produced gas filter is then arranged on a recipient.

Through the use of two different production lines and machines for manufacturing the filters on the one hand and placing the filters on the other, the process of arranging such a gas filter on a recipient becomes complicated and time-consuming.

U.S. Pat. No. 4,318,406 discloses a venting filter for ostomy bags. The venting filter consists of three layers, wherein the central layer comprises a carbon cloth situated between two air-permeable material layers. The three layers are secured to each other by means of a circular weld. Further described are two different embodiments wherein the three-layer filter is secured to the ostomy bag by means of a fourth layer. According to the first embodiment the fourth layer is a material layer with a larger periphery than the periphery of the three-layer filter, wherein the fourth layer is secured against the ostomy bag over the three-layer filter by means of an adhesive layer or weld at the periphery of the fourth layer. According to the second embodiment the fourth layer is an adhesive layer situated between the ostomy bag and the three-layer filter. The operation of the three-layer filter is based on the presence of activated carbon in the carbon cloth.

U.S. Pat. No. 4,120,715 discloses a method for manufacturing the venting filters described in U.S. Pat. No. 4,318,406.

SUMMARY OF THE INVENTION

The present invention has for its object to provide an improved method for arranging a gas filter on a component of a recipient and to provide a device which performs the present method. A further object of the present invention is to provide a simplified, more efficient and less expensive method for arranging a gas filter on a component of a recipient.

Provided according to an aspect of the invention is a method for arranging on a component of a recipient a gas filter comprising a filter layer of filter material and a cover layer of covering material. The method comprises of providing a component of a recipient with a recess, covering the recess with the filter layer and the cover layer, wherein the filter layer is located between the component of the recipient and the cover layer. The method further comprises of welding the filter layer and the cover layer to the component of the recipient by arranging welds such that between the welds tunnels filled with the filter material are formed which are intended to enable gas exchange between the interior of the recipient and an area externally of the recipient.

Embodiments of the invention are based inter alia on the insight that by welding the filter layer and cover layer directly to the component of the recipient a gas filter can be arranged on the recipient within one production line. The two prior art phases are reduced to one phase by arranging welds which secure both the filter layer and cover layer to the component of the recipient and which extend over the recess such that tunnels filled with filter material are formed between the welds. It is possible as a result to save on costs associated with maintaining two separate production lines, servicing two different machines and so on. The method according to the present invention moreover allows gas filters to be arranged more quickly and more efficiently on recipients when compared to prior art methods.

The skilled person will appreciate that the step of providing a component of a recipient with a recess can be performed in different ways. A recipient or component of a recipient, for instance a lid, can be supplied wherein the recipient or the component of the recipient is already provided with a recess. A recipient or component of a recipient can alternatively be supplied wherein the recipient or the component of the recipient is not provided with a recess, and wherein the step of providing a recipient with a recess comprises of providing a recess in the recipient or in the component of the recipient. A recipient typically consists of different components, such as a bottom wall, a plurality of side walls and a removable lid. A recipient can however also be an optionally sealable bag comprising one or more bag walls.

It will be apparent to the skilled person that a gas filter can be arranged on a recipient by arranging the gas filter on a releasable or removable component of the recipient, such as a lid, or on a fixed component of the recipient, such as a bottom wall, side wall or bag wall. It will likewise be apparent to the skilled person that a recipient can be provided with a recess by providing a recess in a releasable or removable component of the recipient, such as a lid, or in a fixed component of the recipient, such as a bottom wall, side wall or bag wall.

The filter layer can be a filter strip, slice, piece, tongue or filter patch. The cover layer can be a cover strip, slice, piece, tongue or cover patch.

In an exemplary embodiment the gas filter is an air filter. An example of an air filter is a High Efficiency Particulate Air (HEPA) filter. In a preferred embodiment the filter material is a non-woven material and the gas filter is a HEPA filter. Compared to other types of gas filter, such as for instance gas filters based on activated carbon, HEPA filters have a longer lifespan. Activated carbon-based filters have a chemical action and bind impurities, although when a filter surface of such a filter is saturated with impurities the filter will no longer work. In contrast, the action of HEPA filters is based on the mechanical capture of impurities between the randomly oriented fibres of the non-woven material, whereby saturation occurs less quickly. It will be however be apparent to the skilled person that the principles of the present invention can be applied to diverse types of gas filter.

In an exemplary embodiment welding of the filter layer and the cover layer to the component of the recipient comprises of arranging welds extending over the recess.

In a preferred embodiment both the filter layer and the cover layer cover the recess at least completely during covering of the recess. This ensures that no gas exchange can occur through the recess other than that which takes place through the tunnels filled with filter material. Moreover in this manner it is ensured that the quantity of filter material and cover material is utilized in an ideal manner. When the recess is kept narrow, the component of the recipient, and by extension the recipient, which often consists of a harder plastic, need not be reduced in strength. The prior art gas filters are on the other hand often placed in larger recesses, wherein the spatial difference between the recess and the filter is taken up by flexible plastic, whereby the recipient possibly loses strength.

In an exemplary embodiment both the filter layer and the cover layer extend at least a distance of 1 mm over an edge of the whole recess. The distance by which the filter layer and cover layer extend over the edge determines the length of the formed tunnels or tubes. Tunnels will thus be created on either side of the recess, whereby gas exchange is possible between the interior of the recipient and the area outside the recipient.

In an exemplary embodiment the welds are arranged such that a longitudinal direction of the tunnels filled with filter material is oriented parallel to the component of the recipient. Shorter or longer tunnels can hereby be arranged in advantageous manner without the thickness of the filter changing.

In a preferred embodiment the welding is performed such that the welds extend from an edge of the recess to an edge of the cover layer. Gas can hereby move from the recipient via successively the recess, the edge of the recess, a tunnel filled with filter material and the edge of the cover layer to the area externally of the recipient. The opposite movement is also possible, wherein gas can move from the area externally of the recipient via successively the edge of the cover layer, a tunnel filled with filter material, the edge of the recess and the recess to the interior of the recipient.

In an exemplary embodiment the welding is performed such that the tunnels filled with filter material have a length in a longitudinal direction parallel to the welds which is related to a filtering effectiveness. Depending on the desired application, the length of the tunnels filled with filter material can hereby be adapted in accordance with the desired filter action. When a better filtering is required, longer tunnels filled with filter material can be provided.

In a preferred embodiment the welding is performed such that a depth filtration can take place through the tunnels filled with filter material. An advantage of depth filtration compared to surface filtration is that saturation of the filter material occurs less quickly in the case of depth filtration, whereby gas filters on the basis of depth filtration have a longer lifespan compared to the lifespan of gas filters on the basis of surface filtration.

In a preferred embodiment the welds are arranged such that gas exchange between an interior volume of the recipient and the area surrounding the recipient is possible only via the tunnels filled with filter material. In an embodiment this can be achieved by arranging the welds not only over the recess but by also arranging a weld on either side of the recess, substantially parallel to the welds arranged over the recess, along the whole width of the cover layer and the filter layer, whereby both layers are connected in a sealing manner to the recipient.

In an exemplary embodiment the welding of the filter layer and cover layer to the recipient comprises of welding using a ribbed welding body, wherein the component of the recipient is supported in a plane of the recess by a support element. According to the embodiment in which a ribbed or toothed welding body pushes on the side of the cover layer while the component of the recipient is supported by a support element, it is possible to arrange welds corresponding to the ribs or teeth of the welding body. In prior art embodiments it is necessary to produce the filters by welding them onto flexible film strips between which the filter material is then confined in a tunnel or tube. This causes complications in production however, because the flexible strips tend to shift relative to each other. The present invention however allows the use of a flexible cover layer and a stiffer surface (component of recipient), whereby the problem of mutual shifting can be solved.

In an exemplary embodiment the support element is flat.

In an alternative embodiment the support element is ribbed such that the ribs correspond to the ribs of the ribbed welding body. In this embodiment welding of the filter layer and cover layer to the component of the recipient comprises of welding using the ribbed welding body, wherein the component of the recipient is supported in the plane of the recess by the ribs of the ribbed support element. During the welding the ribbed support element and the ribbed welding body are positioned such that a rib of the ribbed support element is located opposite a corresponding rib of the ribbed welding body. Each rib of the ribbed welding body is preferably located substantially directly opposite a corresponding rib of the ribbed support element.

In a preferred embodiment the ribbed welding body is a ribbed sonotrode and the support element is a flat anvil.

In an exemplary embodiment the method according to the invention comprises of mutually connecting the filter layer and cover layer before covering the recess. This can for instance be an electrostatic connection or a connection by means of adhesion. Positioning of the filter layer and the cover layer is hereby simplified. In a preferred embodiment the filter layer and the cover layer have substantially the same width.

In a preferred embodiment the method according to the invention comprises of fixing the filter layer and cover layer before welding during covering of the recess. Positioning of the filter layer and cover layer can hereby be improved, and the positioning can take place very precisely before the definitive welding takes place. In an embodiment the filter layer and cover layer are fixed by means of point welds or point solders.

The measures and advantages associated with the above described embodiments of the method for arranging a gas filter on a component of a recipient according to the first aspect of the invention can likewise be applied for a recipient with a gas filter arranged in such a manner, a component of a recipient with an arranged gas filter and embodiments of a device for arranging a gas filter on a component of a recipient in accordance with a respective second, third and fourth aspect of the invention.

Provided according to a second aspect of the invention is a recipient with a gas filter arranged as according to the method of any of the claims 1 to 14.

Provided according to a third aspect of the invention is a component of a recipient with a recess wherein a gas filter comprising a filter layer of filter material and a cover layer of covering material is arranged over the recess in the component of the recipient. The recess is covered with the filter layer, and the filter layer is located between the component of the recipient and the cover layer. Welds are arranged such that tunnels filled with filter material are formed between the welds, which tunnels are intended to enable gas exchange between the interior of the recipient and an area externally of the recipient.

According to a preferred embodiment, the filter material is a non-woven material and the gas filter is a HEPA filter.

According to an exemplary embodiment of the component of the recipient, the filter layer and the cover layer at least completely cover the recess.

According to a preferred embodiment, the filter layer and the cover layer extend at least a distance of 1 mm over an edge of the whole recess.

According to exemplary embodiment, the welds are arranged such that a longitudinal direction of the tunnels filled with filter material is oriented parallel to the component of the recipient.

According to a preferred embodiment, the welds are arranged such that they extend from an edge of the recess to an edge of the cover layer.

According to an exemplary embodiment, the welds are arranged such that the tunnels filled with filter material have a length in a longitudinal direction parallel to the welds which is related to a filtering effectiveness.

According to a preferred embodiment, the welds are arranged such that a depth filtration can take place through the tunnels filled with filter material.

According to an exemplary embodiment, the component of the recipient is at least one component from the group of components comprising a lid, a side wall, a bottom of a recipient and a bag.

Provided according to a fourth aspect of the invention is a device for arranging on a component of a recipient a gas filter comprising a filter layer of filter material and a cover layer of covering material. The device comprises recessing means configured to provide a component of a recipient with a recess, positioning means configured to position the filter layer and the cover layer such that the recess in the component of the recipient is covered by the filter layer and the cover layer, wherein the filter layer is located between the component of the recipient and the cover layer. The device further comprises welding means for welding the filter layer and the cover layer to the component of the recipient, which welding means are configured to arrange welds such that between the welds tunnels filled with filter material are formed which are intended to enable gas exchange between the interior of the recipient and an area externally of the recipient.

According to a preferred embodiment, the filter material is a non-woven material and the gas filter is a HEPA filter.

In a preferred embodiment the welding means are configured to arrange welds which extend over the recess.

In an exemplary embodiment the positioning means are configured to position the filter layer and the cover layer such that both the filter layer and the cover layer at least completely cover the recess.

In a preferred embodiment the positioning means are configured to position the filter layer and the cover layer such that both the filter layer and the cover layer extend at least a distance of 1 mm over an edge of the whole recess.

According to an exemplary embodiment, the welding means are configured to arrange welds such that a longitudinal direction of the tunnels filled with filter material is oriented parallel to the component of the recipient.

According to a preferred embodiment, the welding means are configured to perform the welding such that the welds extend from an edge of the recess to an edge of the cover layer.

According to an exemplary embodiment, the welding means are configured to perform the welding such that the tunnels filled with filter material have a length in a longitudinal direction parallel to the welds which is related to a filtering effectiveness.

According to a preferred embodiment, the welding means are configured to perform the welding such that a depth filtration can take place through the tunnels filled with filter material.

In an exemplary embodiment the welding means are configured to arrange the welds such that gas exchange between an interior volume of the recipient and the area surrounding the recipient is possible only via the tunnels filled with filter material.

In a preferred embodiment the welding means comprise a ribbed welding body and a support element, and the ribbed welding body is configured to weld the filter layer and cover layer to the component of the recipient, wherein the recipient is supported in a plane of the recess by the support element.

In an exemplary embodiment the support element is flat.

In an alternative embodiment the support element is ribbed such that the ribs correspond to the ribs of the ribbed welding body. In this embodiment welding of the filter layer and cover layer to the component of the recipient comprises of welding using the ribbed welding body, wherein the component of the recipient is supported in the plane of the recess by the ribs of the ribbed support element. The ribbed support element and the ribbed welding body are positioned during the welding such that a rib of the ribbed support element is located opposite a corresponding rib of the ribbed welding body. Each rib of the ribbed welding body is preferably located substantially directly opposite a corresponding rib of the ribbed support element.

In an exemplary embodiment the ribbed welding body is a ribbed sonotrode, and the support element is a flat anvil.

In a preferred embodiment the device according to the present invention comprises connecting means for connecting the filter layer and cover layer to each other.

In an exemplary embodiment the device according to the present invention comprises fixation means for fixing the filter layer and cover layer to the recipient before the welding means weld the filter layer and cover layer to the recipient.

BRIEF DESCRIPTION OF THE DRAWINGS

The advantages of the invention will become apparent by reading of the following detailed description of non-limitative exemplary embodiments of the invention, particularly when read in conjunction with the accompanying drawings, in which.

DETAILED DESCRIPTION OF THE EMBODIMENTS

Figure 1A:
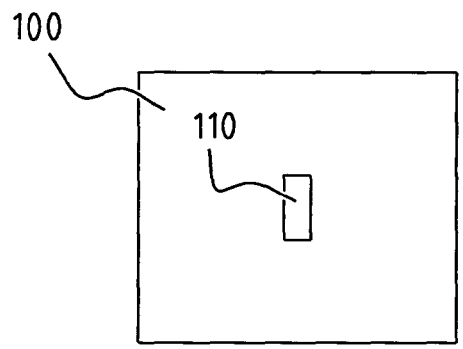
FIG. 1A-1E show schematically the steps of an embodiment of a method according to the invention for arranging a gas filter on a component of a recipient.

The drawings are purely schematic and non-limitative. The size of several elements may be enlarged in the drawings, and for purposes of illustration determined elements may not be drawn to scale.

The reference signs in the claims are not limitative for the scope of protection. The same reference signs in the drawings refer to the same or similar elements.

FIGS. 1A-1E show schematically the different steps of a method for arranging on a component of a recipient 100 a gas filter comprising a filter strip 120 of filter material and a cover strip 130 of covering material. The method comprises of providing a component of a recipient 100 with a recess 110, covering recess 110 with filter strip 120 and cover strip 130, wherein filter strip 120 is located between the component of recipient 100 and cover strip 130. The method further comprises of welding filter strip 120 and cover strip 130 to the component of recipient 100 by arranging welds 140 such that between welds 140 tunnels 150 filled with filter material are formed which connect recess 110 of the component of recipient 100 to an area surrounding the recipient. The welding can take place either ultrasonically or by means of heat welding. Providing a component of a recipient 100 with a recess 110 can take place on the one hand during forming of the recipient. The component of recipient 100 is thus already provided with a recess 110 during the production thereof. Providing a component of a recipient 100 with a recess 110 can on the other hand take place by making a recess 110 by means of punching or lasering.

FIG. 1A shows a top or side view of a rectangular component of a recipient 100 which has a rectangular recess 110. The component of recipient 100 and recess 110 are shown for the sake of clarity as rectangles, although the skilled person will appreciate that the features of the present invention can be applied equally well to recipients, components of recipients and recesses of other shapes, such as circular shapes or polygonal shapes and the like. The skilled person will also appreciate that the formed tunnels are not necessarily parallel, but can for instance also be arranged in other forms, such as for instance in the form of a trapezium. The skilled person will moreover appreciate that the principles of the present invention can be applied to a fixed upper wall or side wall of a recipient or to a releasable lid of the recipient. In a preferred embodiment the recipient is a hermetically sealable box of polypropylene wherein a gas filter is arranged in the lid as according to the method of the present invention. The recipient can for instance be manufactured from clear polypropylene, whereby easy monitoring of the contents is possible.

Figure 1B:
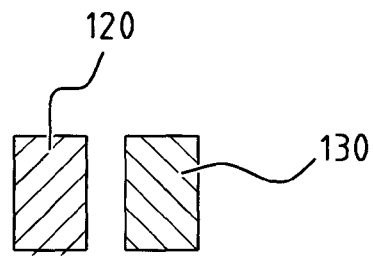

FIG. 1B shows a filter strip 120 of filter material and a cover strip 130 of covering material. The filter material is typically a non-woven material and the cover material is typically a material which is gas-impermeable, such as for instance polypropylene or other similar plastic. The randomly arranged fibres of the non-woven material act as a High Efficiency Particulate Air (HEPA) filter and thus prevent passage of practically all dust particles larger than 0.5 micron. It will be apparent to the skilled person that other materials displaying similar properties to the materials referred to above can be used in order to apply the principles of the present invention.

Figure 1C:
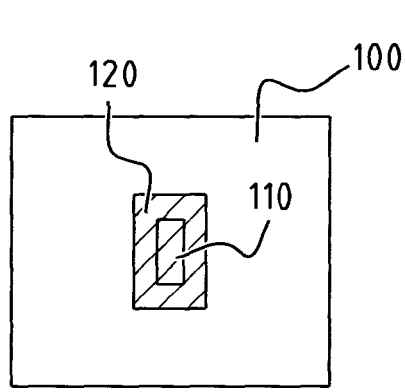

FIG. 1C shows the component of recipient 100, wherein filter strip 120 is placed such that it covers the recess.

Figure 1D:
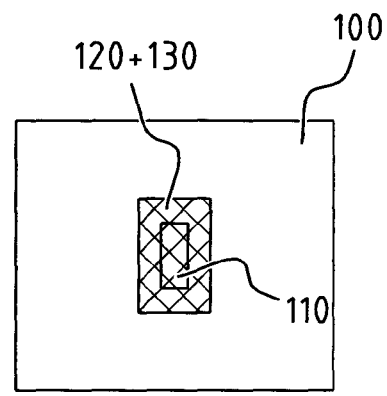

FIG. 1D shows the situation in which cover strip 130 is placed on filter strip 120 and over recess 110.

Figure 1E:
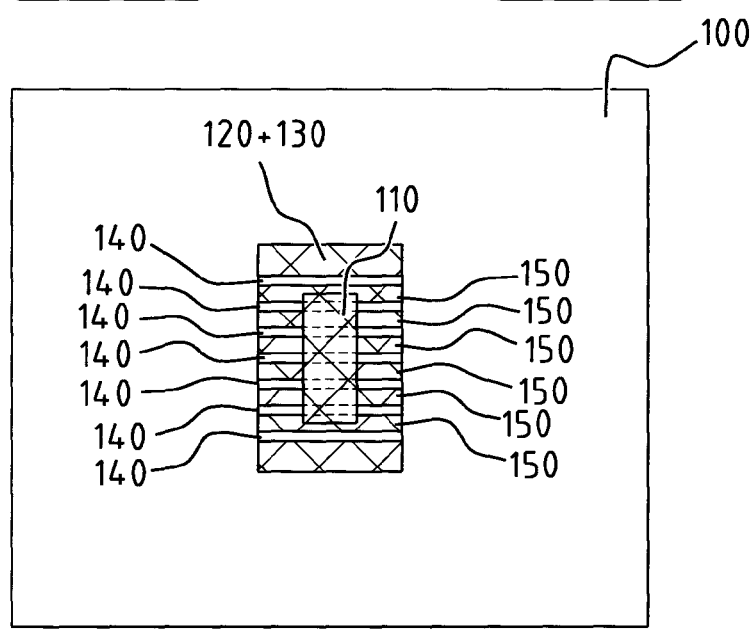

FIG. 1E shows the situation following welding of filter strip 120 and cover strip 130 to the component of recipient 100 by arranging welds 140 which extend over recess 110 such that between welds 140 tunnels 150 filled with filter material are formed which connect recess 110 of the component of recipient 100 to an area surrounding the recipient. Welds 140 are represented as the white strips, since at the locations where the weld is performed the filter material and cover material are fused with the material from which the component of recipient 100 is manufactured. It will be apparent to the skilled person that the materials used are therefore compatible materials which fuse together during welding. Although the welds are preferably arranged by a toothed or ribbed welding body, such as for instance a toothed sonotrode, the welds 140 in FIG. 1E do not pass over recess 110. It is noted here for the sake of clarity that this can be attributed to the fact that within the area of recess 110 there is no recipient material present to which filter strip 120 and cover strip 130 can be fixedly welded, and that as a result the formed tunnels 150 as it were debouch into recess 110. The tunnels 150 filled with filter material extend as it were from an edge of recess 110 to an edge of cover strip 130. A tunnel 150 filled with filter material is formed between two successive welds 140. Welds 140 are arranged on the component of recipient 100 and lie in the plane defined by the component of recipient 100. The tunnels 150 filled with filter material consequently have a longitudinal direction with a parallel orientation relative to the component of recipient 100. The longitudinal direction of tunnels 150 filled with filter material is typically oriented between successively arranged welds from recess 110 to the edge of cover strip 130. By arranging welds 140 further apart or closer together thicker or thinner tunnels 150 can be respectively formed which comprise respectively more or less filter material. The mutual distance between successive welds 140 thus determines the thickness of tunnels 150. The length of welds 140 in combination with the surface area of the used filter strip 120 and/or cover strip 130 further determines the length of the tunnels 150 filled with filter material.

In an alternative embodiment the welds are arranged in multiple passes from different sides of the recess. The welds can for instance thus be arranged first on the left-hand side of the recess and only then on the right-hand side. It is important here that the welds bring about fusing of the filter material and cover material with the component of the recipient, and that the welds overlap at least just beyond the edge with the recess so that the resulting tunnels are in contact with the interior of the recipient as well as with the area surrounding the recipient. The tunnels 150 filled with filter material thus extend from the edge of recess 110 to the edge of cover strip 130 so that gas can move from the recipient via successively the recess, the edge of the recess, a tunnel filled with filter material and the edge of the cover strip to the area externally of the recipient. The opposite movement is also possible wherein gas moves from the area externally of the recipient via successively the edge of the cover strip, a tunnel filled with filter material, the edge of the recess and the recess to the interior of the recipient. The welds on either side of the recess can be arranged successively with the same welding body or with different welding bodies. If a plurality of welding bodies are used, the welds can also be arranged simultaneously on both sides. In the case of a circular or polygonal recess the welds can be arranged in different steps.

The principle of the invention is based on depth filtration of gases through the small tunnels 150 filled with filter material. The depth filtration takes place through tunnels 150 in a direction parallel to the component of recipient 100. This depth filtration ensures on the one hand that there is no chance of contamination and on the other that there is not excessive vapour permeability. Depending on the desired extent of gas exchange, tunnels 150 filled with filter material can be formed with differing lengths. It will be apparent to the skilled person that, the shorter the tunnels 150, the more gas exchange is possible between the recipient and a surrounding area. The filtering itself is likewise influenced by the length of tunnels 150, to the extent that the length is related to the filtering effectiveness, wherein a longer length guarantees a better filtering.

In a preferred embodiment both filter layer 120 and cover layer 130 cover recess 110 at least completely during covering of recess 110. This ensures that no gas exchange can occur through recess 110 other than that which takes place through tunnels 150 filled with filter material.

In an exemplary embodiment both filter layer 120 and cover layer 130 extend at least a distance of 1 mm over an edge of the whole recess 110. The distance to which filter layer 120 and cover layer 130 extend over the edge determines the length of the formed tunnels 150 or tubes.

In a preferred embodiment welds 140 are arranged such that gas exchange between an interior volume of recipient 100 and the area surrounding recipient 100 is possible only via the tunnels 150 filled with filter material. In an embodiment this can be achieved by arranging the welds not only over recess 110, such as the four most central welds 140 in FIG. 1E, but by also arranging a weld on either side of the recess substantially parallel to welds 140 arranged over the recess and along the whole width of cover layer 130 and filter layer 120, such as the upper and lower weld 140 in FIG. 1E, whereby both layers 120, 130 are connected in a sealing manner to the component of recipient 100.

In an alternative embodiment a cover layer of porous covering material is used which is at least partially gas-permeable. The cover layer can for instance have pores, perforations or micro-perforations, whereby a surface filtration can also take place in addition to a depth filtration through the tunnels.

In an exemplary embodiment the welding of filter layer 120 and cover layer 130 to the component of recipient 100 comprises of welding using a ribbed welding body, wherein the component of recipient 100 is supported in a plane of recess 110 by a support element.

In an exemplary embodiment the support element is flat.

In an alternative embodiment the support element is ribbed such that the ribs correspond to the ribs of the ribbed welding body. In this embodiment welding of the filter layer and cover layer to the recipient comprises of welding using the ribbed welding body, wherein the component of the recipient is supported in the plane of the recess by the ribs of the ribbed support element. The ribbed support element and the ribbed welding body are positioned during the welding such that a rib of the ribbed support element is located opposite a corresponding rib of the ribbed welding body. Each rib of the ribbed welding body is preferably located substantially directly opposite a corresponding rib of the ribbed support element.

In a preferred embodiment the ribbed welding body is a ribbed sonotrode and the support element is a flat anvil.

In an exemplary embodiment the method according to the invention comprises of mutually connecting filter layer 120 and cover layer 130 before covering the recess 110. This can for instance be an electrostatic connection or filter layer 120 and cover layer 130 can be adhered to each other.

In a preferred embodiment the method according to the invention comprises of fixing filter layer 120 and cover layer 130 before welding during covering of recess 110.

Figure 2:
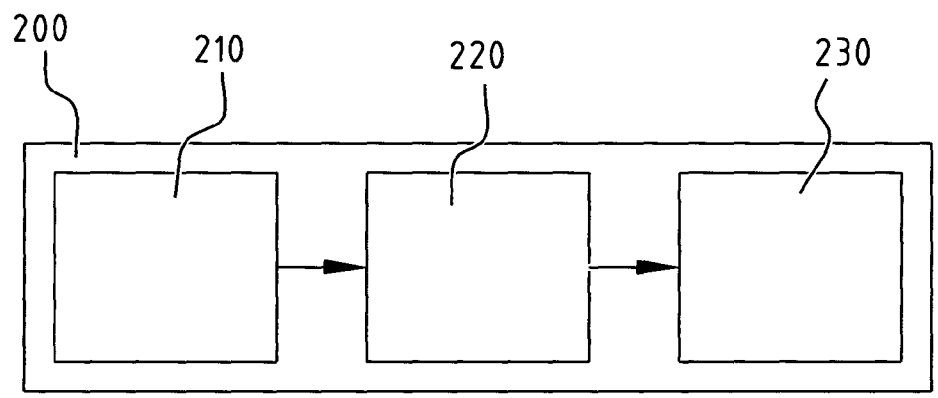
FIG. 2 shows schematically a device for arranging a gas filter on a component of a recipient.

FIG. 2 shows schematically a device 200 for arranging on a component of a recipient a gas filter comprising a filter layer of filter material and a cover layer of covering material. Device 200 comprises recessing means 210 configured to provide a component of a recipient with a recess, positioning means 220 configured to position the filter layer and the cover layer such that the recess in the component of the recipient is covered by the filter layer and the cover layer, wherein the filter layer is located between the component of the recipient and the cover layer. The device further comprises welding means 230 for welding the filter layer and the cover layer to the component of the recipient, which welding means 230 are configured to arrange welds such that between the welds tunnels filled with filter material are formed which are intended to enable gas exchange between the interior of the recipient and an area externally of the recipient.

In a preferred embodiment welding means 230 are configured to arrange welds which extend over the recess.

In an exemplary embodiment positioning means 220 are configured to position the filter layer and the cover layer such that both the filter layer and the cover layer at least completely cover the recess.

In a preferred embodiment positioning means 220 are configured to position the filter layer and the cover layer such that both the filter layer and the cover layer extend at least a distance of 1 mm over an edge of the whole recess.

In an exemplary embodiment welding means 230 are configured to arrange the welds such that gas exchange between an interior volume of the recipient and the area surrounding the recipient is possible only via the tunnels filled with filter material.

In a preferred embodiment welding means 230 comprise a ribbed welding body and a support element, and the ribbed welding body is configured to weld the filter layer and cover layer to the component of the recipient, wherein the component of the recipient is supported in a plane of the recess by the support element.

In an exemplary embodiment the support element is flat.

In an alternative embodiment the support element is ribbed such that the ribs correspond to the ribs of the ribbed welding body. In this embodiment welding of the filter layer and cover layer to the component of the recipient comprises of welding using the ribbed welding body, wherein the component of the recipient is supported in the plane of the recess by the ribs of the ribbed support element. The ribbed support element and the ribbed welding body are positioned during the welding such that a rib of the ribbed support element is located opposite a corresponding rib of the ribbed welding body. Each rib of the ribbed welding body is preferably located substantially directly opposite a corresponding rib of the ribbed support element.

In an exemplary embodiment the ribbed welding body is a ribbed sonotrode and the support element is a flat anvil.

In a preferred embodiment, device 200 according to the present invention comprises connecting means for connecting the filter layer and cover layer to each other.

In an exemplary embodiment, device 200 according to the present invention comprises fixation means for fixing the filter layer and cover layer to the component of the recipient before the welding means weld the filter layer and cover layer to the component of the recipient.

Where in FIG. 1 the principles of the invention are shown in the light of a rectangular recess 110 wherein welds 140 extend in the width direction over recess 110, it will be apparent to the skilled person that the principles of the invention can also be applied for a different orientation of the welds (for instance in longitudinal direction of recess 110, or diagonally). In other embodiments the welds can be in bent or curved arrangement instead of straight. Bent or curved tunnels filled with filter material are in this way formed. The skilled person will further appreciate that principles of the invention can be applied in the case of recesses of diverse shapes and that the recess need not be rectangular but can for instance also have a polygonal shape, circular shape or oval shape. Depending on the shape of the recess, it is possible to work with different shapes of filter layer and cover layer. Layers with a round shape can thus be used to cover round recesses. The skilled person will appreciate that the shapes of the recess and those of the filter layer and cover layer need not correspond, just as long as the filter layer and cover layer cover the recess. The skilled person will further appreciate that the principles of the invention can still be applied when the shapes and/or dimensions of the filter layer and cover layer do not correspond to each other, just as long as the filter layer and cover layer cover the recess. It is thus possible for the cover layer to extend at least partially beyond the filter layer or for the filter layer to extend at least partially beyond the cover layer.

Figure 3:
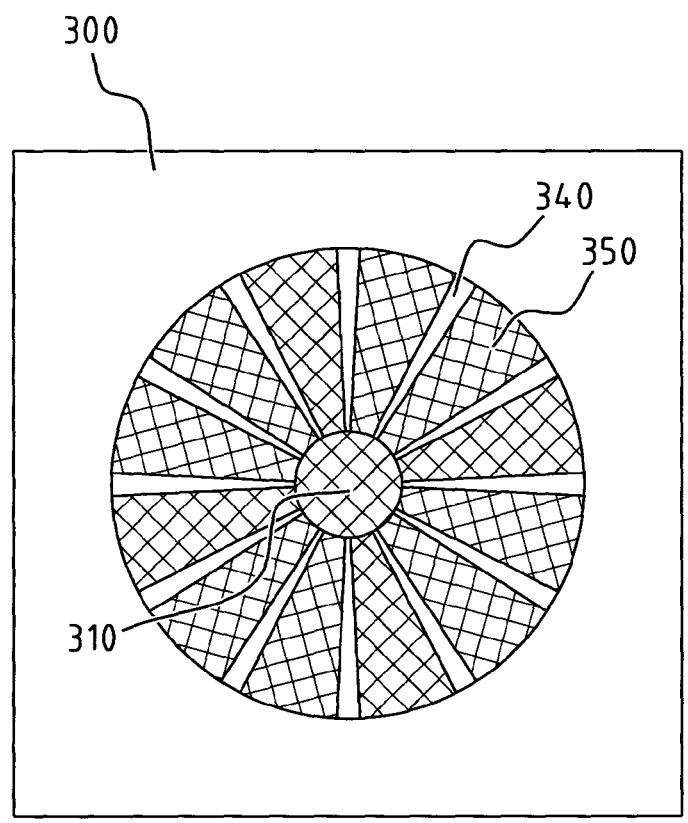
FIG. 3 shows a possible exemplary embodiment of a gas filter arranged in accordance with an exemplary embodiment of the method according to the invention.

FIG. 3 shows a top or side view of a component of a recipient with circular recess 310, wherein welds 340 are arranged such that tunnels 350 filled with filter material are created in the form of a trapezium. This result can be obtained by means of using a star-shaped welding body. Parallel tunnels can also be obtained here in alternative manner by welding with a trapezoidal welding body. The form of the welds is determined by the welding body used. Use has been made of a round filter patch as filter layer and a round cover patch as cover layer. At the location where the welds are arranged the filter material and the cover material fuse with each other and with the component of the recipient. Thus created between the welds are tunnels 350 filled with filter material which extend from the edge of recess 310, where the filter material is in contact with the inner space or interior volume of the recipient, along the arranged welds 340 and then debouch on the outer side of the recipient where they are in contact with the area surrounding the recipient. Welds 340 extend from an edge of recess 310 to an edge of the round cover patch. The welds are arranged on the component of recipient 300 and consequently lie in the plane defined by the component of recipient 300. A longitudinal direction of welds 340 is oriented radially from recess 310 to an edge of the cover patch. The tunnels 350 filled with filter material have a longitudinal direction which extends radially between successive welds 340 from recess 310 to an edge of the cover patch and which is oriented parallel to the component of the recipient. As in FIG. 1, the double hatching in FIG. 3 indicates the presence of filter material 120 and cover material 130. The orientation of the hatching is not significant.

Figure 4:
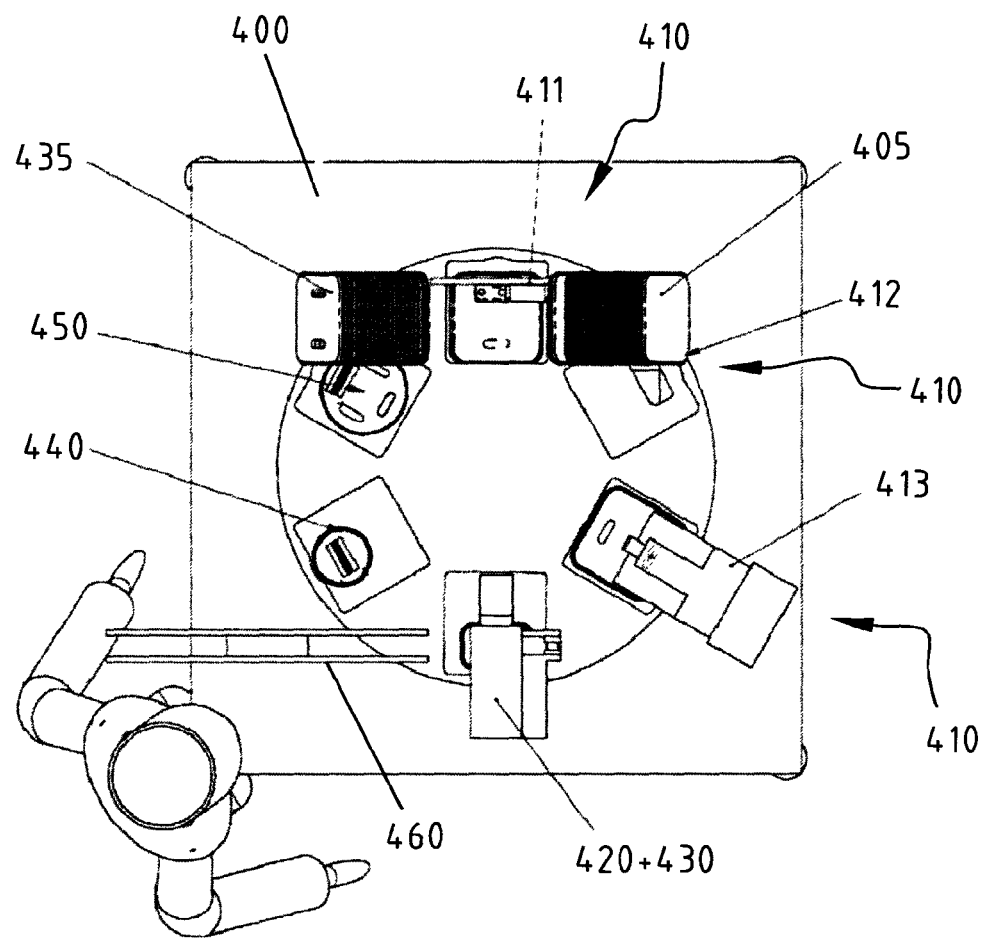
FIG. 4 shows a top view of an exemplary embodiment of a device for arranging a gas filter on a recipient.

FIG. 4 shows an exemplary embodiment of a device 400 for arranging on a component of a recipient 405 a gas filter comprising a filter layer of filter material and a cover layer of covering material. Device 400 comprises recessing means 410 configured to provide a component of a recipient with a recess. In the embodiment of FIG. 4 recessing means 410 comprise an automatic loading station 411 or manual loading station 412 (both shown) for the supply of covers 405 without recess and a punching station 413 for punching a recess into a cover 405. Instead of a punching station 413, a laser station can also be provided in order to laser a recess into cover 405. The device further comprises positioning means 420 configured to position the filter layer and the cover layer such that the recess in the component of the recipient is covered by the filter layer and the cover layer, wherein the filter layer is located between the component of the recipient and the cover layer, and welding means 430 for welding the filter layer and the cover layer to the component or cover of the recipient, which welding means 430 are configured to arrange welds such that between the welds tunnels filled with filter material are formed which are intended to enable gas exchange between the interior of the recipient and an area externally of the recipient. In the embodiment of FIG. 4 positioning means 420 and welding means 430 are incorporated in a single station. In an alternative embodiment of a device according to the invention positioning means 420 and welding means 430 are each provided in a separate station. Positioning means 420 can be configured to fix the filter layer and cover layer by means of point soldering. Device 400 further comprises a cooling station 440 for cooling the welds and a monitoring station 450 configured to monitor in non-destructive manner whether the gas filters have been arranged in a correct manner on cover 435. Device 400 further comprises supply means 460 configured to supply the filter layer and cover layer. Supply means 460 comprise for instance an unwinding machine or reel for supplying filter strips and/or cover strips. Although the different stations of device 400 are disposed in a circular path in FIG. 4, it will be apparent to the skilled person that the stations can likewise be positioned on a rectangular or square path, or in a straight line, without detracting from the principles of the invention.

Although the principles of the invention are described above with reference to specific embodiments, it will be appreciated that the description is given solely by way of example and may not be construed as limiting the scope of protection, which is defined by the following claims.

The invention claimed is:

1. A method for arranging on a component of a recipient a gas filter comprising a filter layer of filter material and a cover layer of covering material, wherein the method comprises:
    providing a component of a recipient with a recess;
    covering the recess with the filter layer and the cover layer, wherein the filter layer is located between the recipient and the cover layer; and
    welding the filter layer and the cover layer to the component of the recipient by arranging welds such that between the welds tunnels filled with filter material are formed which are intended to enable gas exchange between the interior of the recipient and an area externally of the recipient.

2. The method as claimed in claim 1, wherein the filter material is a non-woven material and the gas filter is a High Efficiency Particulate Air (HEPA) filter.

3. The method as claimed in claim 1, wherein welding of the filter layer and the cover layer to the recipient comprises arranging welds extending over the recess.

4. The method as claimed in claim 1, wherein both the filter layer and the cover layer cover the recess at least completely during covering of the recess.

5. The method as claimed in claim 1, further comprising arranging welds such that a longitudinal direction of the tunnels filled with filter material is oriented parallel to the component of the recipient.

6. The method as claimed in claim 1, wherein the welding is performed such that the welds extend from an edge of the recess to an edge of the cover layer.

7. The method as claimed in claim 1, wherein the welding is performed such that the tunnels filled with filter material have a length in a longitudinal direction parallel to the welds which is related to a filtering effectiveness.

8. The method as claimed in claim 1, wherein the welding is performed such that a depth filtration can take place through the tunnels filled with filter material.

9. The method as claimed in claim 1, wherein the welding is performed such that gas exchange between an interior volume of the recipient and the area surrounding the recipient is possible only via the tunnels filled with filter material.

10. The method as claimed in claim 1, wherein the welding of the filter layer and cover layer to the component of the recipient comprises welding using a ribbed welding body, wherein the component of the recipient is supported in a plane of the recess by a support element.

11. The method as claimed in claim 1, further comprising mutually connecting the filter layer and cover layer before covering the recess.

12. A recipient with a gas filter arranged as according to the method of claim 1.

13. A component of a recipient with a recess, wherein a gas filter comprising a filter layer of filter material and a cover layer of covering material is arranged over the recess in the component of the recipient, wherein the recess is covered with the filter layer, and wherein the filter layer is located between the component of the recipient and the cover layer; and wherein welds are arranged such that tunnels filled with filter material are formed between the welds, which tunnels are intended to enable gas exchange between the interior of the recipient and an area externally of the recipient.

14. The component of a recipient as claimed in claim 13, wherein the filter material is a non-woven material and the gas filter is a High Efficiency Particulate Air (HEPA) filter.

15. The component of a recipient as claimed in claim 13, wherein the filter layer and the cover layer at least completely cover the recess.

16. The component of a recipient as claimed in claim 13, wherein the filter layer and the cover layer extend at least a distance of 1 mm over an edge of the whole recess.

17. The component of a recipient as claimed in claim 13, wherein the component is at least one component from the group of components consisting of a cover, a side wall, a bottom of a recipient and a bag.

18. The component of a recipient as claimed in claim 13, wherein the welds are arranged such that a longitudinal direction of the tunnels filled with filter material is oriented parallel to the component of the recipient.

19. The component of a recipient as claimed in claim 13, wherein the welds are arranged such that they extend from an edge of the recess to an edge of the cover layer.

20. The component of a recipient as claimed in claim 13, wherein the welds are arranged such that a depth filtration can take place through the tunnels filled with filter material.

* * * * *